United States Patent
Pezeshki et al.

(10) Patent No.: US 11,595,102 B2
(45) Date of Patent: Feb. 28, 2023

(54) REPORTING QUANTIZED USER EQUIPMENT (UE) ORIENTATION FOR BEAM SELECTION

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Junyi Li, Franklin Park, NJ (US); Taesang Yoo, San Diego, CA (US); Qiang Wu, San Diego, CA (US); Arumugam Chendamarai Kannan, San Diego, CA (US); Jingchao Bao, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/238,141

(22) Filed: Apr. 22, 2021

(65) Prior Publication Data

US 2021/0336682 A1    Oct. 28, 2021

Related U.S. Application Data

(60) Provisional application No. 63/015,409, filed on Apr. 24, 2020.

(51) Int. Cl.
*H04L 1/02* (2006.01)
*H04B 7/06* (2006.01)
*G06N 20/00* (2019.01)

(52) U.S. Cl.
CPC .......... *H04B 7/0695* (2013.01); *G06N 20/00* (2019.01); *H04B 7/063* (2013.01); *H04B 7/0617* (2013.01)

(58) Field of Classification Search
CPC .... H04B 7/0695; H04B 7/088; H04B 7/0413; H04B 7/0632; H04B 7/0456; H03B 7/0617; H04W 72/046; H04W 16/28; H04W 40/18; H04W 24/10; H04W 43/06; H04W 72/1231; H04L 41/147; H04L 41/16; H04L 43/08
USPC ......................................... 375/267, 260, 262
See application file for complete search history.

(56) References Cited

U.S. PATENT DOCUMENTS

| | | | |
|---|---|---|---|
| 2019/0182683 A1* | 6/2019 | Khirallah | H04W 24/08 |
| 2020/0127907 A1* | 4/2020 | Koo | H04L 43/06 |
| 2020/0366340 A1* | 11/2020 | Zhang | G06N 20/00 |
| 2021/0167875 A1* | 6/2021 | Shen | H04B 17/318 |

(Continued)

*Primary Examiner* — Khai Tran
(74) *Attorney, Agent, or Firm* — Patterson + Sheridan, L.L.P.

(57) ABSTRACT

Various aspects relate generally to the beam management procedures in wireless communications systems. Some aspects more specifically relate to the selection of beams for communications to and from a UE and a network entity based on quantized orientation information for a user equipment (UE). In some implementations, a network entity can use the quantized orientation information and a machine learning model to predict a set of beams that may be suitable for communications to and from the UE and the network entity, which may be a subset of the beams that the network entity can generally use for communications to and from the UE and the network entity.

27 Claims, 10 Drawing Sheets

(56) References Cited

U.S. PATENT DOCUMENTS

2021/0399794 A1\* 12/2021 Arora ................. H04B 7/18513
2021/0400651 A1\* 12/2021 Ottersten .............. H04W 24/02

\* cited by examiner

REPORTING QUANTIZED USER EQUIPMENT (UE) ORIENTATION FOR BEAM SELECTION

CROSS-REFERENCE TO RELATED APPLICATIONS

This application claims benefit to U.S. Provisional Patent Application Ser. No. 63/015,409, entitled "Reporting Quantized User Equipment (UE) Orientation for Beam Selection," filed Apr. 24, 2020 and assigned to the assignee hereof, the contents of which are hereby incorporated by reference in its entirety.

TECHNICAL FIELD

This disclosure relates generally to wireless communications, and more particularly, to techniques for beam selection for transmissions based on orientation information for a user equipment (UE).

DESCRIPTION OF THE RELATED TECHNOLOGY

Wireless communication systems are widely deployed to provide various telecommunication services such as telephony, video, data, messaging, and broadcasts. These wireless communication systems may employ multiple-access technologies capable of supporting communication with multiple users by sharing available system resources (for example, bandwidth, time, space, and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

In 5G NR, beam management procedures are generally used to identify beams to use for communications to and from a UE and a base station. The beams may be selected using a beam sweep, in which a network entity transmits a signal on each of a plurality of beams, and a UE reports information identifying the beams that the UE detected and signal quality metrics for the identified beams. The beam sweep may include transmissions on each of the plurality of beams that can be used for communications to and from the UE and the base station, though the UE may not be able to detect all of the beams. Thus, communications resources (e.g., time and frequency resources) may be wasted when a network entity performs beam management procedures.

SUMMARY

The systems, methods, and devices of the disclosure each have several innovative aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient selection of beams for communications to and from a UE and a network entity, for example, to select a reduced number of optimal beams that may allow for reduced monitoring time by a UE and/or free up resources for data transmissions.

One innovative aspect of the subject matter described in this disclosure can be implemented in a method for wireless communication. The method can be performed, for example, by a user equipment (UE), and generally includes transmitting, to a network entity, a report including at least one quantized orientation value associated with an orientation of the UE; and receiving, from the network entity, information identifying a set of first beams to use for transmitting or receiving communications to or from the network entity based on the transmission of the report including the at least one quantized orientation value.

In some implementations, the UE may determine the UE orientation based on measurements by orientation sensors at the UE, and the at least one quantized orientation value may be based on the determined UE orientation.

In some implementations, the report may include at least two of the set of quantized orientation values, selected based on the UE orientation computed based on the sensors.

In some implementations, the method may further include receiving, from the network entity, signaling configuring a set of quantized orientation values. The at least one quantized orientation value may be from the set of quantized orientation values. The signaling may identify at least one of a number of quantization levels or a quantization scheme for quantizing the orientation of the UE.

In some implementations, the signaling may configure at least two sets of quantized orientation values. Each set of the at least two sets of quantized orientation values may be associated with a respective type of signaling used to transmit the report. Selecting the at least one quantized value may include selecting a quantized orientation value from one of the at least two sets of quantized orientation values based on the type of signaling used to transmit the report. A granularity of each set of quantized orientation values in the at least two sets of quantized orientation values may be different.

In some implementations, the type of signaling may include one of uplink control information (UCI), a medium access control (MAC) control element (CE), or radio resource control (RRC) signaling.

In some implementations, the method may further include determining a location of the UE. The report may indicate the location of the UE. The report may indicate a quantized confidence level, from a set of quantized confidence levels, that is associated with the location of the UE.

In some implementations, the method may further include determining a confidence level for the reported location of the UE, and the report may include the confidence level associated with the determined location of the UE. The confidence level may be a quantized confidence level selected from a set of quantized confidence levels.

In some implementations, the reporting may be transmitted via a radio resource control (RRC) message targeting a location management function (LMF).

Another innovative aspect of the subject matter described in this disclosure can be implemented in a method for wireless communication. The method can be performed, for example, by a network entity, such as a gNodeB. The method generally includes receiving a report indicating at least one quantized orientation value associated with an orientation of a user equipment (UE); selecting, based on at least the quantized orientation value associated with the orientation of the UE, one or more beams to use in communicating with the UE; and communicating with the UE using the selected one or more beams.

In some implementations, the method may further include transmitting, to the UE, signaling configuring a set of quantized orientation values including the at least one quantized orientation value.

In some implementations, the signaling may identify one or more of a number of quantization levels or a quantization scheme for quantizing a measured orientation of the UE.

In some implementations, the signaling may indicate at least two sets of quantized orientation values, each of the at least two sets of quantized orientation values being associated with a type of signaling used for the report.

In some implementations, the at least one quantized orientation value is included in one of the at least two different sets of quantized orientation values depending on whether the reporting is signaled via uplink control information (UCI), a medium access control (MAC) control element (CE), or radio resource control (RRC) signaling.

In some implementations, the report may indicate a location of the UE. The one or more beams may be selected further based on the location of the UE.

In some implementations, the method may further include updating a training data set based on the at least one quantized orientation value, the location of the UE, and the selected one or more beams; and retraining a machine learning model for predicting one or more beams to use to communicate with the UE based on the updated training data set.

In some implementations, the report indicates a confidence level associated with the location of the UE. The confidence level may be a quantized confidence level selected from a set of quantized confidence levels.

In some implementations, the one or more beams are selected using a machine learning model for predicting one or more beams to use to communicate with the UE when the confidence level exceeds a threshold value.

In some implementations, the selected one or more beams are selected based on a machine learning model trained to predict one or more beams to use to communicate with the UE based at least on the at least one quantized orientation value.

In some implementations, the at least one quantized orientation value is received from a gNodeB.

In some implementations, the at least one quantized orientation value is received in a radio resource control (RRC) message from a user equipment via a gNodeB.

Other innovative aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various innovative aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
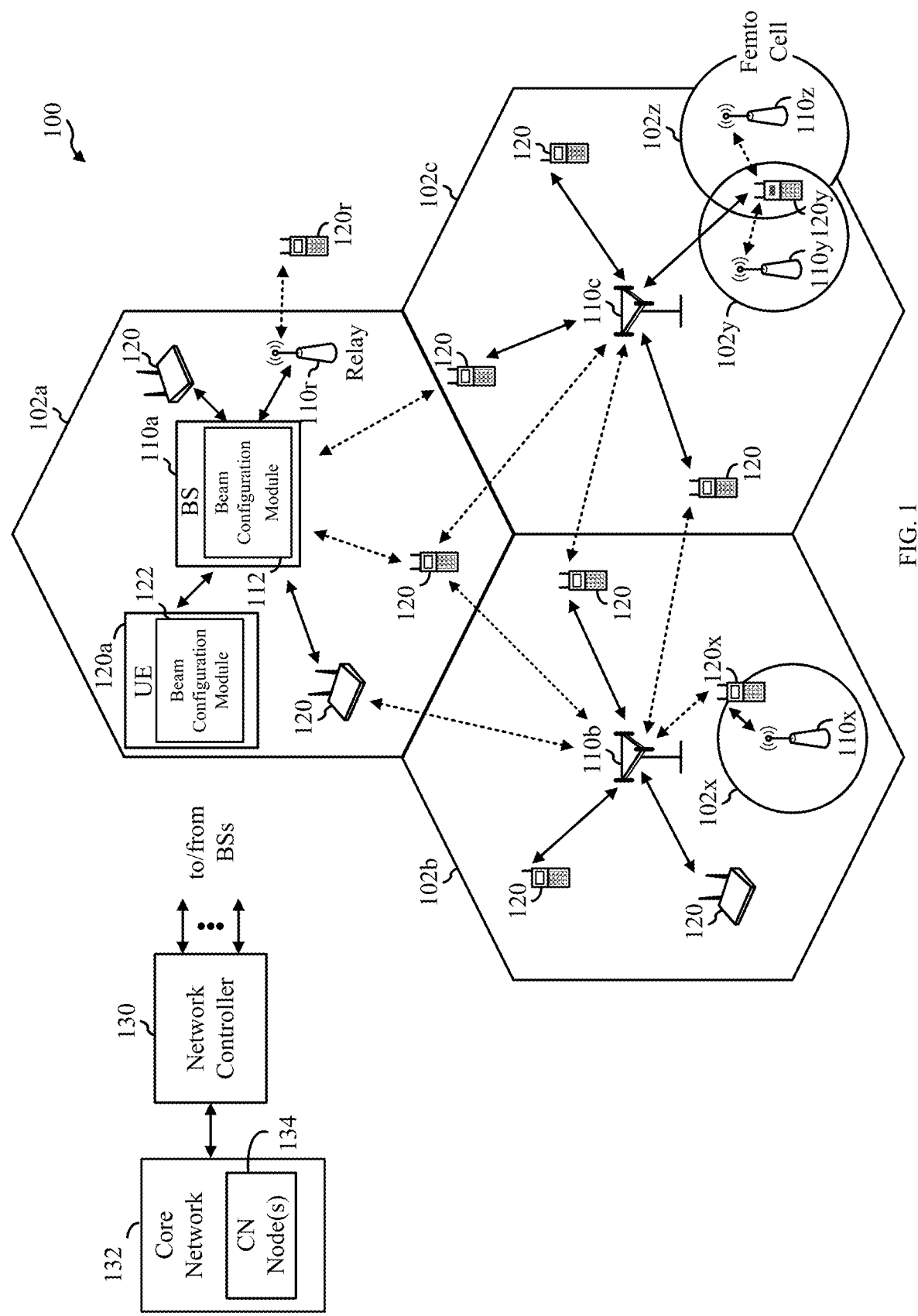
FIG. 1 shows a block diagram conceptually illustrating an example wireless communication network, in accordance with some aspects of the present disclosure.

The following description is directed to some particular implementations for the purposes of describing innovative aspects of this disclosure. Innovative aspects of this disclosure generally provides examples beam selection using quantized orientation information and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Various aspects relate generally to the beam management procedures in wireless communications systems. Some aspects more specifically relate to the selection of beams for communications to and from a UE and a network entity based on UE position information and quantized orientation information for a user equipment (UE). In some implementations, a network entity can use the position information, the quantized orientation information, and a machine learning model to predict a set of beams that may be suitable for communications to and from the UE and the network entity, which may be a subset of the beams that the network entity can generally use for communications to and from the UE and the network entity. Generally, the predicted set of beams that may be suitable for communications to and from the UE and the network entity may be beams that result in the received signal strength of a transmission exceeding a threshold signal strength correlated with successful reception of a transmission, beams that are most likely to be detected by a receiving device, or the like. The predicted set of beams may change as the orientation of the UE changes, as the orientation of the UE (and the direction in which the antennae of the UE are oriented) may affect which beams are most likely to be detected, and thus which beams are likely to result in successful transmissions between the UE and the network entity. Further, location information may influence which beams are included in the predicted set of beams, as beams that are consistently not detected or on which transmissions consistently fail when a UE is at a given geographic location may be excluded from the predicted set of beams.

Particular aspects of the subject matter described in this disclosure can be implemented to realize one or more of the following potential advantages. In some examples, the described techniques can be used to reduce an amount of time spent identifying beams to use in communications to and from a UE and a network entity. Further, because fewer time-frequency resources may be used during beam management procedures, more time-frequency resources may be available for use in data transmissions to and from the UE and the network entity, which may provide for increased bandwidth and data carrying capacity in a wireless communications system. Further, selecting beams for communications between a UE and a network entity using quantized UE orientation information may reduce an SSB burst duration, which may allow for reduced monitoring time by a UE and/or free up resources (that would otherwise be used for SSB transmissions) for data transmissions.

In general, any number of wireless networks may be deployed in a given geographic area. Each wireless network may support a particular radio access technology (RAT) and may operate on one or more carriers in one or more frequency bands. A RAT may also be referred to as an air interface. Within the carriers, wireless device such as base stations and UEs may operate on various frequency resources including subcarriers (or "tones"), channels, or subbands. RATs within a given geographic area may operate on different frequency to avoid interference with one another.

The techniques described herein may be used for various wireless networks and radio technologies. While aspects may be described herein using terminology commonly associated with 3G, 4G, and/or new radio (for example, 5G NR) wireless technologies, aspects of the present disclosure can be applied in other generation-based communication systems.

NR access may support various wireless communication services, such as enhanced mobile broadband (eMBB) targeting wide bandwidth (for example, 80 MHz or beyond), millimeter wave (mmW) targeting high carrier frequency (for example, 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The techniques presented herein may be applied in various bands utilized for NR. For example, for the higher band referred to as FR4 (for example, 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

FIG. 1 illustrates an example wireless communication network 100 in which aspects of the present disclosure may be performed. For example, a base station (BS) 110*a* of the wireless communication network 100 may be configured with beam configuration module 112 configured to perform (or assist BS 110 in performing) operations 700 of FIG. 7 to identify beams for use in transmitting or receiving communications to or from a network entity based on reported UE orientation information, in accordance with aspects of the present disclosure. Similarly, a UE 120*a* of the wireless communication network 100 may be configured with an beam configuration module 122 configured to perform (or assist UE 120 in performing) operations 600 of FIG. 6 to report UE orientation and communicate with the BS 110*a* based on the reported UE orientation (for example, from BS 110*a*), in accordance with aspects of the present disclosure.

The wireless communication network 100 may be an NR system (for example, a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (for example, via a backhaul).

The BSs 110 communicate with UEs 120*a-y* (each also individually referred to herein as UE 120 or collectively as UEs 120) in the wireless communication network 100. The UEs 120 (for example, 120*x* and 120*y*) may be dispersed throughout the wireless communication network 100, and each UE 120 may be stationary or mobile. Wireless communication network 100 may also include relay stations (for example, relay station 110*r*), also referred to as relays or the like, that receive a transmission of data and/or other information from an upstream station (for example, a BS 110*a* or a UE 120*r*) and sends a transmission of the data and/or other information to a downstream station (for example, a UE 120 or a BS 110), or that relays transmissions between UEs 120, to facilitate communication between devices.

Figure 2:
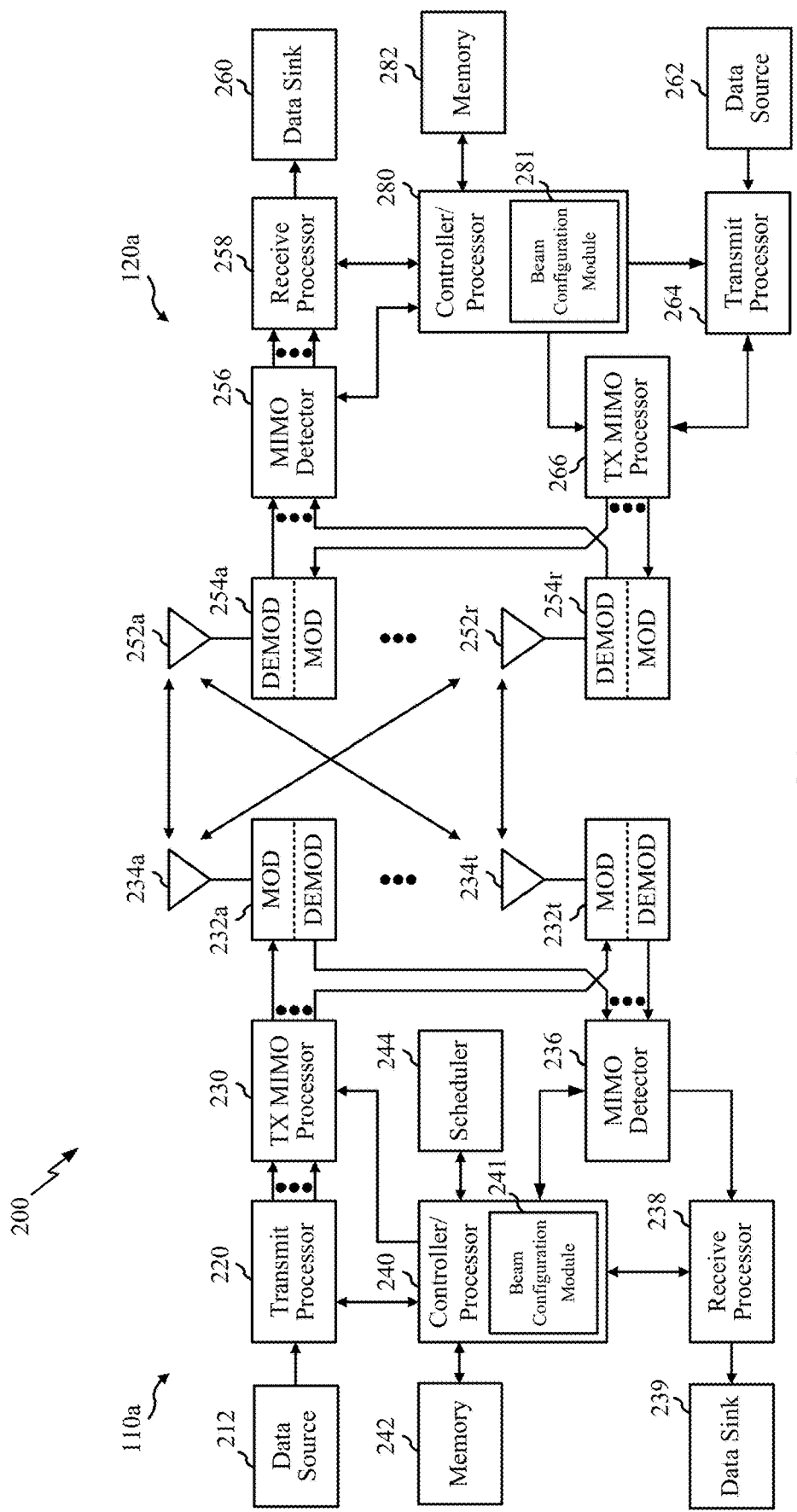
FIG. 2 shows a block diagram conceptually illustrating an example a base station (BS) and an example user equipment (UE), in accordance with some aspects of the present disclosure.

FIG. 2 illustrates example components of BS 110*a* and UE 120*a* (for example, in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH) or group common PDCCH (GC PDCCH), among other examples. The data may be for the physical downlink shared channel (PDSCH), among other examples. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (for example, precoding) on the data symbols, the control symbols, and/or the reference symbols, if applicable, and may provide output symbol streams to the modulators (MODs) 232*a*-232*t*. Each modulator 232 may process a respective output symbol stream (for example, for OFDM) to obtain an output sample stream. Each modulator may further process (for example, convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (for example, filter, amplify, downconvert, and digitize) a respective received signal to obtain input samples. Each demodulator may further process the input samples (for example, for OFDM) to obtain received symbols. A MIMO detector 256 may obtain received symbols from all the demodulators 254*a*-254*r*, perform MIMO detection on the received symbols if applicable, and provide detected symbols. A receive processor 258 may process (for example, demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the modulators in transceivers 254*a*-254*r* (for example, for SC-FDM), and transmitted to the BS 110*a*. At the BS 110*a*, the uplink signals from the UE 120*a* may be received by the antennas 234, processed by the demodulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a beam configuration module 241 and the controller/processor 280 of the UE 120*a* has a beam configuration module 281. The beam configuration module 241 may be configured to perform operations 700 of FIG. 7 and/or the beam configuration module 281 may be configured to perform operations 600 of FIG. 6. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones or bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (for example, 30 kHz, 60 kHz, 120 kHz or 240 kHz). The symbol and slot lengths scale with the subcarrier spacing. The CP length also depends on the subcarrier spacing.

Figure 3:
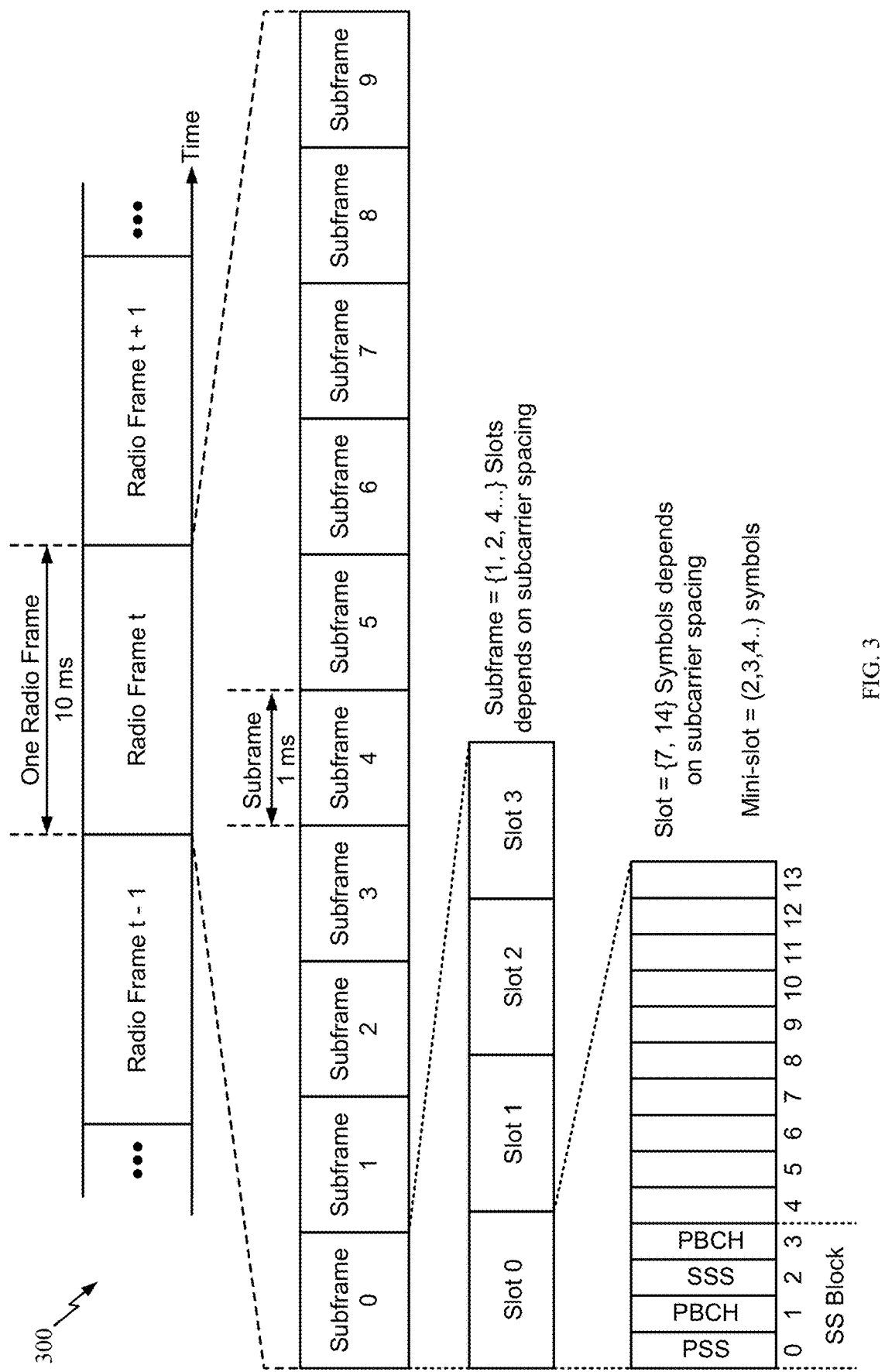
FIG. 3 shows an example frame format for communication in a wireless communication network, in accordance with some aspects of the present disclosure.

FIG. 3 is a diagram showing an example of a frame format 300 for NR. The transmission timeline for each of the downlink and uplink may be partitioned into units of radio frames. Each radio frame may have a predetermined duration (for example, 10 ms) and may be partitioned into 10 subframes, each of 1 ms, with indices of 0 through 9. Each subframe may include a variable number of slots (for example, 1, 2, 4, 8, 16, . . . slots) depending on the SCS. Each slot may include a variable number of symbol periods (for example, 7 or 14 symbols) depending on the SCS. The symbol periods in each slot may be assigned indices. A mini-slot, which may be referred to as a sub-slot structure, refers to a transmit time interval having a duration less than a slot (for example, 2, 3, or 4 symbols).

Each symbol in a slot may indicate a link direction (for example, DL, UL, or flexible) for data transmission and the link direction for each subframe may be dynamically switched. The link directions may be based on the slot format. Each slot may include DL/UL data as well as DL/UL control information.

Figure 6:
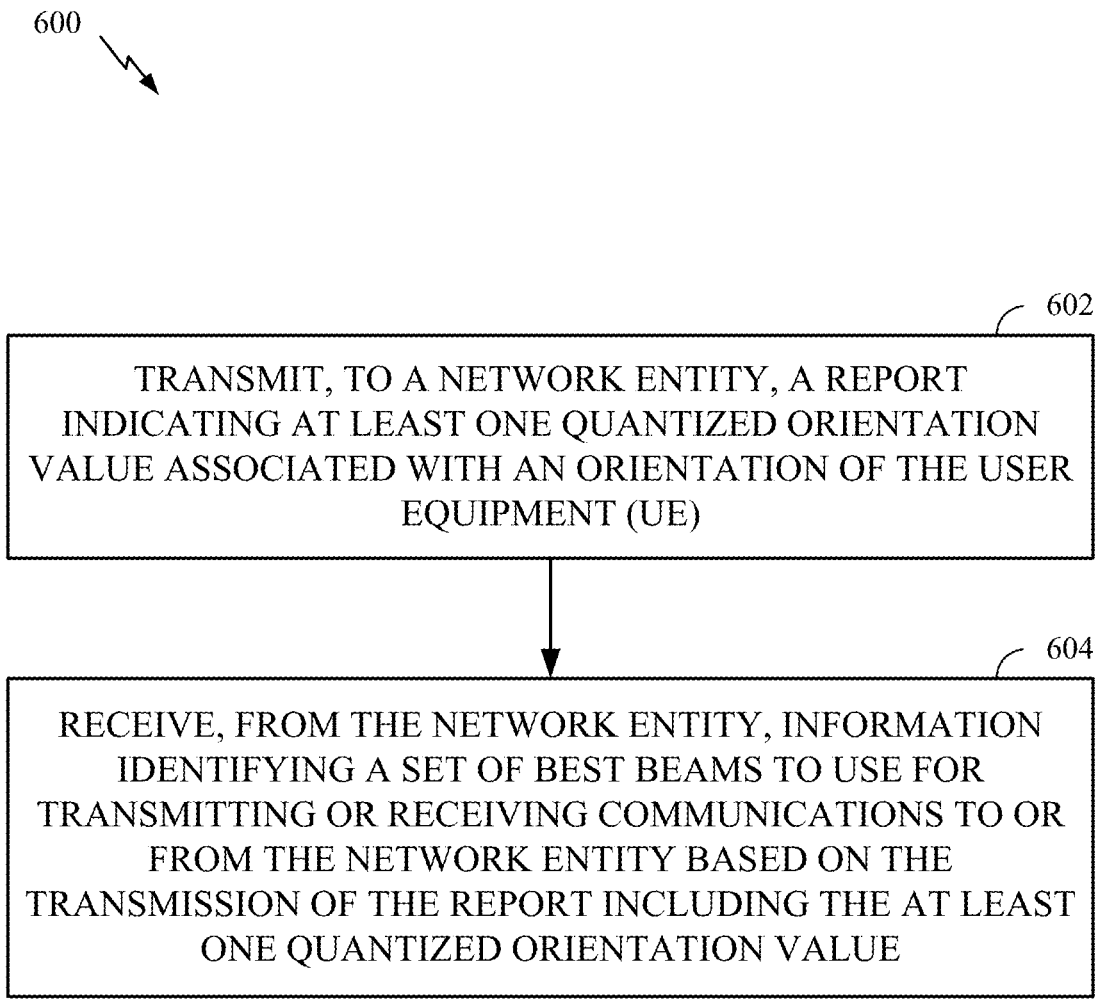
FIG. 6 shows a flowchart illustrating an example process for wireless communication by a user equipment that supports beam selection based on quantized orientation information for a user equipment (UE) in accordance with some aspects of the present disclosure.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within a radio frame, an SS burst set periodicity, and a system frame number, among other examples.

Further system information such as, remaining minimum system information (RMSI), system information blocks (SIBs), other system information (OSI) can be transmitted on a physical downlink shared channel (PDSCH) in some subframes.

Figure 4:
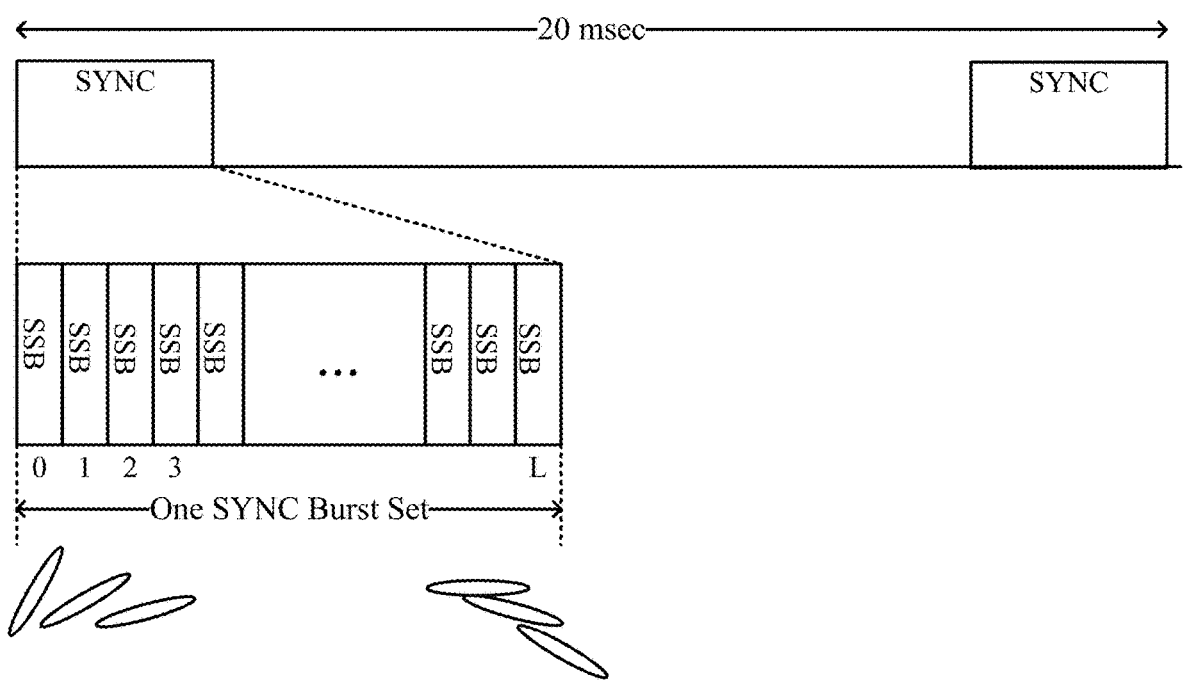
FIG. 4 shows different synchronization signal blocks (SSBs) transmitted using different beams, in accordance with some aspects of the present disclosure

As shown in FIG. 4, the SS blocks may be organized into SS burst sets to support beam sweeping performed as part of a beam management procedure. As shown, each SSB within a burst set may be transmitted using a different beam, which may help a UE quickly acquire both transmit (Tx) and receive (Rx) beams (particular for mmW applications). A physical cell identity (PCI) may still be decoded from the PSS and SSS of the SSB. As shown in FIG. 4, a synchronization burst set, which may be used in beam management procedures, may include L+1 SSBs. Each of the L+1 SSBs may be transmitted by a network entity using a different beam transmitted in a different beam direction. A UE may receive some of the SSBs transmitted in the synchronization burst set and may not receive other SSBs that the network entity transmitted during the beam management procedure. In response to detecting at least some of the SSBs in the synchronization burst set, the UE may generate and transmit a report to the network entity indicating which of the SSBs, corresponding to particular beams the network entity used to transmit the SSBs, that the UE detected as well as indicating signal strength metrics for each of some or all of the detected beams. The network entity can then select one or more of the beams identified in the report for communications to and from the UE and the network entity. For example, the network entity may select the n beams with the highest signal quality metrics to communicate with the UE. In some other examples, the UE may identify a single beam, such as the beam with the highest signal quality metric, in the report transmitted to the network entity, and the network entity can use the identified beam for communications to and from the UE.

NR deployment options may include non-standalone (NSA) or standalone (SA) options. Some deployment scenarios may include one or both NR deployment options. A standalone cell may need to broadcast both SSBs and remaining minimum system information (RMSI), for example, using SIB1 and SIB2. A non-standalone cell may need to broadcast SSBs, but may not need to broadcast RMSI. In a single carrier in NR, multiple SSBs may be sent in different frequencies, and may include various different types of SSBs.

SSB bursts, as shown in FIG. 4, may be used for beam management. Typical beam management procedures may entail a beam sweeping procedure in which a network entity, such as a base station, transmits beams consecutively in each of multiple directions. The beam directions may, for example, collectively cover 360 degrees around the network entity over a plurality of directions (for example, 64 different beam directions). In another example, the beam directions may cover a portion of a total coverage area served by a network entity. For example, in a deployment where a network entity includes three antenna panels, each antenna panel may cover a 120 degree segment of the total coverage area, and the beam directions may collectively cover the 120 degree segment over the plurality of directions. However, for any given UE in either of such deployment scenarios or others, only a subset of the beams may be detected during the beam management procedure. For example, transmissions using a beam direction opposite of a direction from the network entity to the UE may not be detected by the UE. Because only a subset of the beams may be detected, the network entity may waste network resources in performing a beam sweep across each of the plurality of directions, which may reduce the amount of resources available for other transmissions (for example, data transmissions).

According to some aspects of the present disclosure, beam management procedures may be enhanced (for example, in FR2) using side-information and machine learning models. The side information may include, for example, UE position information, which may include latitude and longitude information from a satellite position system, time difference of arrival (TDOA) information determined for signals transmitted between the network entity and the UE, and UE orientation information, among other examples.

Example ML-Based Beam Prediction

Figure 5:
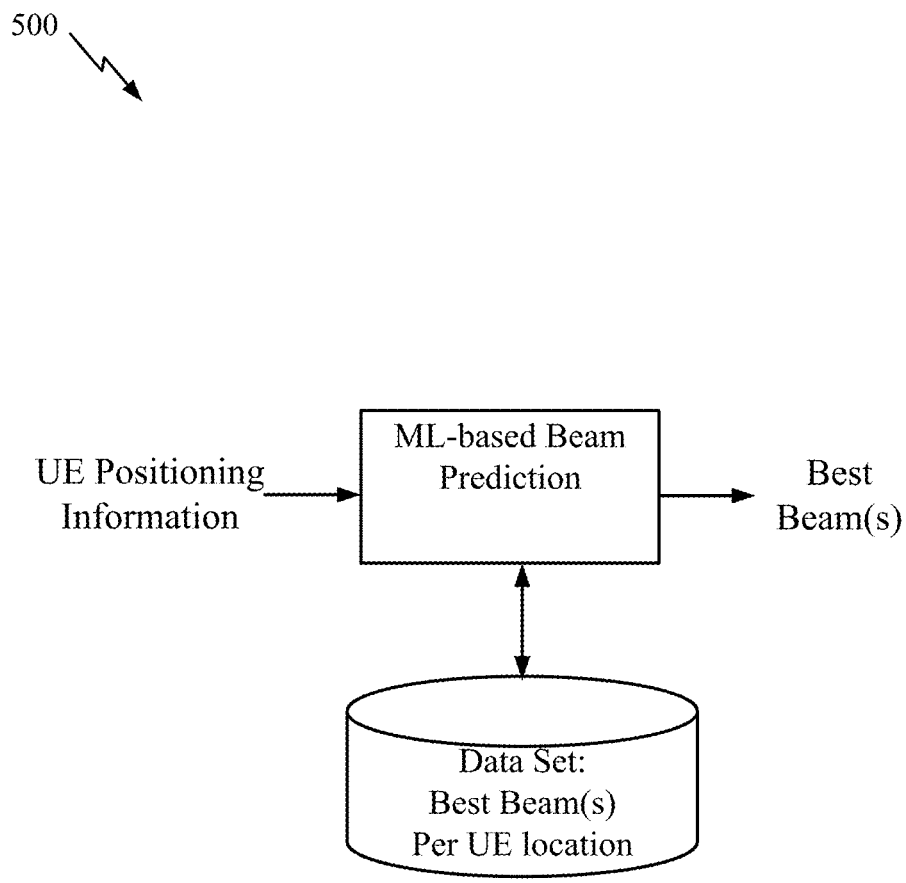
FIG. 5 shows an example machine learning (ML)-based beam prediction module that supports beam selection based on quantized orientation information for a user equipment (UE), in accordance with some aspects of the present disclosure.

As illustrated in FIG. 5, a machine learning (ML)-based (beam prediction) model may be trained to learn relationships between the position of a UE, such as one or more of a location, device orientation, direction, or other information indicative of UE position or change in position, and one or more best (or "optimal") beams or other suitable beams that may be used to communicate with the UE. Position determinations may be performed by the UE, by a network entity such as a gNB, or by a location server referred to as a location management function (LMF). The size of a dataset associating UE position to one or more best beams may be large, because there may be a potentially unlimited number of combinations of UE position information and best beams used for communications between the network entity and the UE. Further, the size of the dataset may increase as additional position information is included in the dataset. For example, for any given location, a potentially unlimited number of different orientations, over six degrees of freedom (vertical, horizontal, and azimuthal axes, yaw, roll, and pitch), may exist and may be associated with a beam or set of beams for use in communications between a network entity and a UE. As the size of the dataset may be very large, and as a UE may not have sufficient processing power to train a machine learning model based on such a large dataset, it is not feasible to share the entire dataset with the UE. In some cases, rather than share the data set, a more practical approach may be to train the model, such as a neural network (NN), using the dataset, and then share parameters (for example, weights and the like) for the trained model with the UE.

Such a machine learning model may be trained using various techniques to learn optimal beam directions for a given reported location. Given an input of a reported UE location, and in some examples also device orientation, a network entity on which the trained machine learning model is deployed can predict a set of beams to use in performing a beam sweep. This set of beams and associated directions may be a subset of the beams and associated directions that are supported by the network entity. The network entity can transmit using the predicted set of beams and need not sweep across each possible beam direction in order to identify the best beams to use in communicating with the UE.

In some implementations, the machine learning model may be trained using supervised learning techniques in which an input data set of a plurality of {location, beam direction(s)} two-tuples is used to train the machine learning model to recognize relationships between different locations and orientations and the optimal beam directions for communicating with a UE at different locations and based on different device orientations. The input data set may include or be derived from information, for example, received in relation to communications using sub-6 GHz bands. The machine learning model may be trained to output information that may be relevant to communications using other bands (for example, mmWave bands), such as information predicting a best beam or set of beams, or information associated with a predicted best beam or set of best beams, that may then be used to select and generate a beam for communication with the UE. In some implementations, the machine learning model may include a softmax layer that generates a probability score for each beam direction. The network entity on which the machine learning model is deployed can use the generated probability scores to identify beams to use in communicating with a UE. The beam(s) that may be predicted to be or identified as the best beams to communicate with the UE may, thus, be the n beams with the highest probability scores generated by the machine learning model based on the current location of the UE.

The machine learning model may be trained offline and deployed to a network entity (for example, a gNodeB) for use in identifying one or more best beams or probable best beams for use in communicating with a UE based on a reported location of the UE. During wireless communications operations, the UE may independently determine its location (and in some examples also orientation), identify a best beam (for example, based on a beam sweep), and report the determined location (or location and orientation) and the identified best beam to the network entity. If the identified best beam matches the best beam predicted by the machine learning model deployed at the network entity, the network entity may determine that the machine learning model is accurate. If, however, the identified best beam is a mismatch with the best beam predicted by the machine learning model, the network entity may determine that one or more errors in the machine learning model or in identifying the best beam exist.

For example, the best or optimal beam directions determined during the deployment phase may be inaccurate, for example, due to poor reference signal received power (RSRP) or signal-to-interference-plus-noise (SINR) relative to current RSRP or SINR measurements at the UE. Another potential source of mismatch stems from the fact that, even though the location estimates and best beam estimates may be accurate, the actual environmental conditions at the time of beam selection may be quite different than the environmental conditions during the training phase. In other words, there may be some dynamic aspects of the environment surrounding the base station and UEs that were not captured during the offline training phase (for example, such as a car passing by, or the like). It may be difficult to alleviate mismatch caused by such issues due to the different environmental conditions. However, if a network entity consistently observes that for a given UE position, other sets of best beams are reported by a UE (different than the ML-predicted beams) then the network entity may infer that this mismatch is not due to the dynamics of the environment, and that the dataset needs to be updated.

The machine learning described herein may take advantage of any appropriate machine learning algorithm. In some non-limiting examples, the machine learning algorithm is a supervised learning algorithm, unsupervised learning algorithm, reinforcement learning algorithm, a deep learning algorithm or an artificial neural network algorithm.

In some examples, the machine learning is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network may be composed of an interconnected group of artificial neurons (for example, neuron models). These artificial neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (for example, weight values are established during a training phase in which the network learns how to identify particular classes by their typical input data characteristics).

Different types of artificial neural networks can be used to implement machine learning, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (for example, a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, the machine learning is performed using a deep convolutional network (DCN). DCNs are collections of convolutional networks, configured with additional pooling and normalization layers. DCNs have achieved state-of-the-art performance on many tasks. DCNs can be trained using supervised learning in which both the inputs and outputs are known for many exemplars and are used to modify the weights of the network by use of gradient descent methods. That is, the a training data set may include a plurality of vectors, with each vector having an input data set from which a DCN is trained to generate an inference, and an output corresponding to the inference that the DCN should generate for the input data set. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Example Identification of Beams for Communications with a User Equipment (UE) Based on Quantized UE Orientation Information As described above, various aspects of the present disclosure relate to beam management procedures in wireless communications systems. Some implementations of the present disclosure more specifically provide techniques for identifying and selecting beams for communicating with a UE based on quantized UE orientation information. The techniques may be used, for example, to efficiently select a beams for use in communications between a network entity and a UE, which may allow for reduced monitoring time by a UE and/or free up resources (that would otherwise be used for SSB transmissions) for data transmissions.

A network entity may identify and use beams for communications between a network entity and a UE based on information reported by the UE, such as the orientation of the UE, the location of the UE, and/or a confidence value associated with a reported location of the UE. In some aspects, a full set of synchronization signal block (SSB) beams, discussed above, may be used for discovery purposes (for example, initial network acquisition), and a reduced set of beams, such as a set of beams that are predicted to be the best beams for communications between the UE and the network entity based on the information reported to the network entity by the UE, may be used after a UE is in an idle mode or a connected mode.

As described above, a machine learning based algorithm may be trained to predict a set of (optimal/best) beams for a UE given position information. While such an algorithm may be used for the identification and selection of beams for communications with a UE based on UE orientation information described herein, generally, any type of algorithm or logic may be used to determine how to identify and select beams for communications between a network entity and a UE.

As discussed in further detail below, a UE may determine the orientation of the UE based on one or more sensors and quantize the determined orientation of the UE to reduce the size of the orientation information transmitted to a network entity. Generally, the orientation of the UE may be represented as orientation data over six degrees of freedom, leading to a potentially unlimited number of possible orientations. To allow for efficient transmission of orientation information to a network entity, the UE may quantize the determined orientation into one of a plurality of quantization values that represents an orientation of the UE. In response, the UE may receive, from the network entity, configuration information identifying beams to use in communications to and from the network entity, which the network entity may predict based on UE position information the quantized orientation of the UE.

A network entity, correspondingly, may receive at least quantized orientation information from the UE and use at least the quantized orientation to predict a set of best/ optimized beams for the network entity to use in communications to and from the UE. In some implementations, the network entity may further receive UE position information that the network entity can use to predict the set of best/ optimized beams for the network entity to use in communications to and from the UE. The network entity can use a machine learning model to predict and select the set of best/optimized beams for the network entity to use in communications to and from the UE. The network entity may then communicate with the UE using the predicted/ selected set of beams. For example, the network entity may indicate, to the UE, the selected beams and may transmit one or more signals to the UE using the selected beams after indicating the selected beams to the UE.

FIG. 6 shows a flowchart illustrating an example process 600 for wireless communication by a user equipment that supports beam selection based at least on quantized orientation information for a user equipment (UE), in accordance with some aspects of the present disclosure. The operations of process 600 may be implemented by a wireless communication device or its components as described herein. For example, process 600 may be performed by a UE 120a of FIG. 1 or FIG. 2 to report orientation and/or location information to a network entity and receive information identifying a set of best beams to use for communications with the network entity based on the reported orientation and/or location information, in accordance with some aspects of the present disclosure.

In some implementations, process 600 begins in block 602, where the UE transmits a report including at least one quantized orientation value of the UE to a network entity. Generally, the at least one quantized orientation value may be associated with an orientation of the UE. The UE may transmit the report to the network entity using, for example, radio resource control (RRC) signaling, a medium access control (MAC) control element (CE) (MAC-CE), uplink control information (UCI), or other uplink signaling in which a UE can transmit data to a network entity. The report may also indicate UE position information that the network entity can use to select one or more beams to use in communicating with the UE.

In some implementations, the quantized orientation value reported by the UE may be based on a measurement of a UE orientation. UE can measure an orientation of the UE using one or more sensors, such as gyroscopes, compasses, barometers, and the like. The UE may determine its orientation using these sensors as six degrees of freedom (6DOF) data. The UE may select the at least one quantized orientation value by identifying the quantized orientation value that corresponds to the determined orientation using sensor data at the UE. In a simple example, suppose that a UE determines its orientation based on information from a compass. The quantized orientation values may correspond to different compass sectors. For example, a first quantized orientation value may correspond to a compass bearing between 000 and 030; a second quantized orientation value may corresponding to a compass bearing between 030 and 060, and so on.

At block 604, the UE receives information identifying a set of best beams to use for transmitting or receiving communications to or from the network entity based on the transmission of the report including the at least one quantized orientation value. The UE may receive this information in various types of downlink signaling in which the UE can receive information from the network entity. Subsequently, the UE can use the identified set of best beams for transmitting control and data signaling to the network entity on the uplink and for receiving control and data signaling from the network entity.

Figure 7:
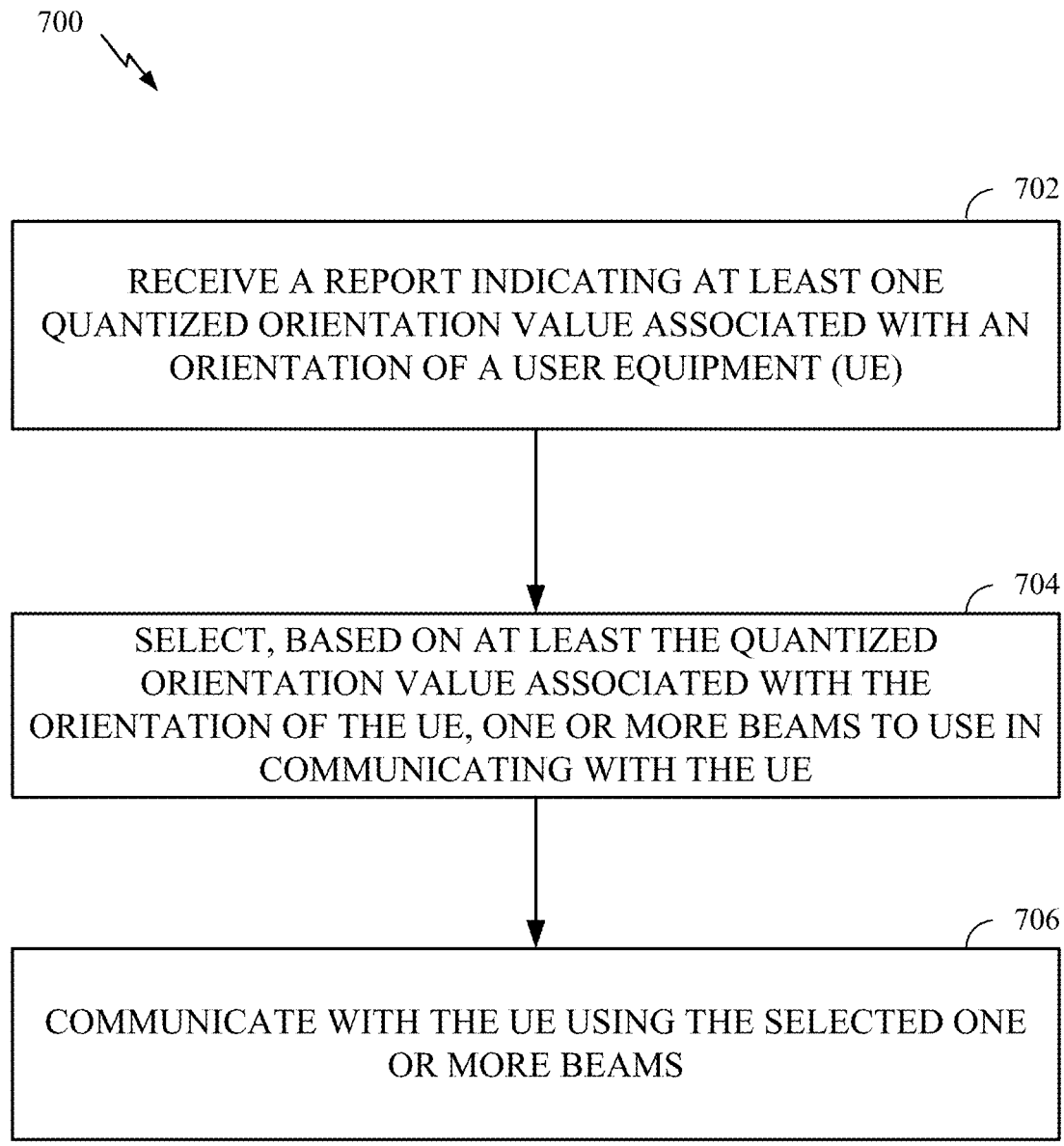
FIG. 7 shows a flowchart illustrating an example process for wireless communication by a user equipment that supports beam selection based on quantized orientation information for a user equipment (UE) in accordance with some aspects of the present disclosure.

FIG. 7 shows a flowchart illustrating an example process 700 for wireless communications by a network entity that supports beam selection based on quantized orientation information for a user equipment (UE). Process 700 may be considered complementary to process 600 of FIG. 6. The operations of process 700 may be implemented by a wireless communication device or its components as described herein. For example, the operations of process 700 may be performed by a base station 120a (for example, a gNB) of FIG. 1 or FIG. 2 to receive at least quantized orientation information and modify an SSB burst pattern based on at least the received quantized orientation information reported by a UE performing process 600 of FIG. 6.

In some implementations, process 700 begins, at block 702, with the network entity receiving a report indicating at least one quantized orientation value associated with an orientation of a user equipment (UE). The network entity may receive the report in various types of uplink signaling from the UE, such as in radio resource control (RRC) signaling, a medium access control (MAC) control element (CE) (MAC-CE), uplink control information (UCI), or other uplink signaling in which a UE can transmit data to a network entity.

At block 704, the network entity selects, based on at least the quantized orientation value associated with the orientation of the UE, one or more beams to use in communicating with the UE. In some implementations, the network entity can select the one or more beams to use in communicating with the UE using a machine learning model trained to predict one or more best beams for communicating with the UE based on an input of UE position information and a quantized orientation value. The machine learning model may explicitly output an indication of a best beam or set of beams to use in communicating with the UE or a probability distribution over the possible beams that the network entity can use in communicating with the UE. If the machine learning model outputs a probability distribution, the network entity can identify the beams having the n highest probabilities in the probability distribution as the beams to use in communicating with the UE.

At block 706, the network entity communicates with the UE using the selected one or more beams. In some implementations, the network entity may transmit signaling on the downlink to the UE including information identifying the selected one or more beams to configure the UE to monitor for signals using the selected one or more beams. Subsequently, the network entity may transmit control and data signaling on the downlink and may receive control and data signaling on the uplink using the selected one or more beams.

Figure 8:
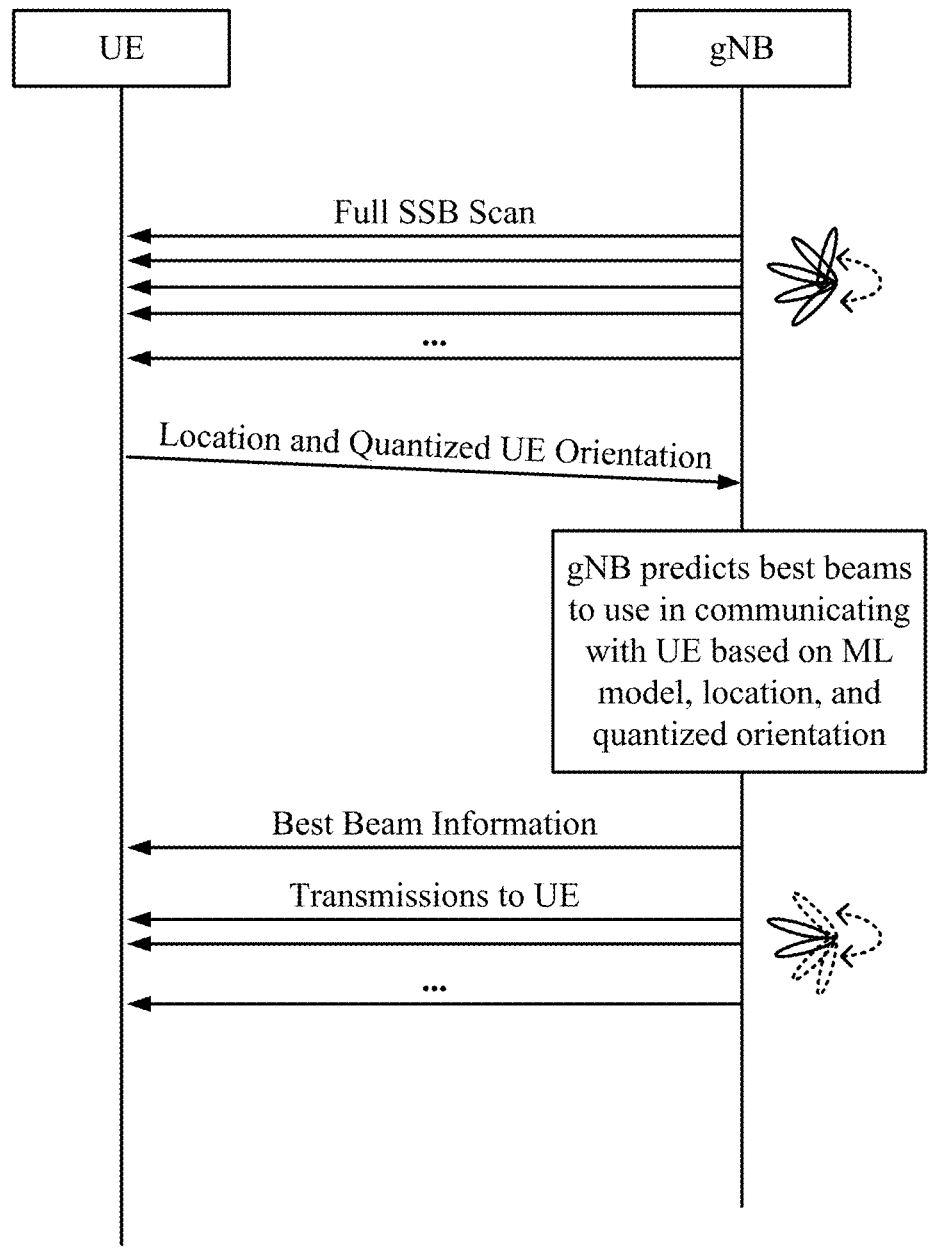
FIG. 8 shows a call flow diagram illustrating an example of UE orientation information reporting and beam prediction that supports beam selection based on quantized orientation information for a user equipment (UE), in accordance with some aspects of the present disclosure.

Operations 600 and 700 of FIGS. 6 and 7 may be understood with reference to the call flow diagram shown in FIG. 8. In other words, the gNB and UEs of FIG. 8 may perform operations 600 and 700 of FIGS. 6 and 7.

FIG. 8 shows a call flow diagram illustrating an example of UE orientation information reporting and beam prediction by devices in a wireless communications network that supports beam selection based on UE position information and quantized orientation information for a user equipment (UE), in accordance with some aspects of the present disclosure.

As illustrated in FIG. 8, the gNB may initially perform a full synchronization signal burst (SSB) scan, discussed above with respect to FIG. 4, sweeping all configured SSB beams (for example, 64 SSBs). The initial full SSB scan may be performed, for example, when a UE attaches to a gNB or otherwise at some point in time when a UE initially begins communications with the gNB.

The UE may determine the location and orientation of the UE based on various sensors at the UE. For example, the UE may determine the location of the UE based on a satellite positioning system, time difference of arrival (TDOA) information derived from signals received from a plurality of network entities, or other techniques for determining the geographic location of the UE. The UE may determine the orientation of the UE based on compasses, gyroscopes, accelerometers, barometers, and/or other orientation/position sensors at the UE. Because a representation of the orientation of the UE may have a large number of values (for example, when orientation is reported as data in six degrees of freedom (6DOF) including information about pitch, yaw, roll, vertical movement, and lateral movement on each of two axes), overhead may be reduced by quantizing the determined orientation of the UE into one of a plurality of quantized values (i.e., by reporting one of a plurality of values in a fixed set of values rather than a potentially infinite number of possible orientation values calculated from sensor output).

The UE may be configured with the plurality of quantized values by the gNB. In some implementations, the UE may be configured with a plurality of sets of quantized values. Each set of quantized values in the plurality of sets may be associated with a type of signaling used to transmit at least the quantized orientation information to the gNB, and a granularity of each set of quantized values in the plurality of sets may be different (e.g., to account for an amount of data that may be carried in a particular type of signaling used in reporting the quantized orientation information). For example, where the UE reports at least the quantized orientation information using lower layer signaling, a set with a smaller number of quantized values may be used; meanwhile, where the UE reports at least the quantized orientation using higher layer signaling, a set of quantized values with a larger number of values may be used. That is, the quantization level used to quantize UE orientation information may be based on whether the report is transmitted to the gNB, for example, using radio resource control (RRC) signaling, in a medium access control (MAC) control element (CE) (MAC-CE), or in uplink control information (UCI).

At the gNB/network entity, the gNB can input the received UE location information and quantized UE orientation information into a machine learning model trained to predict a reduced set of beams (for example, a set of "best" beams) to use in transmitting or receiving communications to or from the network entity. The reduced set of beams may be, for example, a set of beams predicted to result in a highest signal strength (such as RSSI or RSRP, among other examples) at the UE given the location of the UE and the orientation of the UE. The gNB can proceed to use the predicted set of best beams to communicate with the UE. In some implementations, as illustrated, the gNB can signal the UE with information about the set of best beams. The gNB can signal the information about the set of best beams in one or more system information blocks (SIBs) indicating a time and duration of an SSB burst for an SSB burst pattern including SSBs transmitted on the set of best beams, thereby implicitly signaling the UE with information about the set of best beams. Based on the SSB burst time and duration information, the UE can scan for SSBs transmitted by the gNB and identify the beams in the set of best beams as the beams on which SSBs are received from the gNB. After signaling the UE with the information about the set of best beams, the gNB can communicate with the UE using one or more beams in the set of best beams. As updated quantized orientation information is received from a UE, the gNB can select a new set of predicted best beams to use in communications between the gNB and the UE.

It should be recognized that the machine learning-based selection of beams based on quantized UE orientation information may be performed at any time while the UE is connecting to or connected with the gNB. For example, the machine learning-based selection of beams based on quantized UE orientation information may be preceded by a a previously predicted set of beams used for communications between the UE and the network entity. For example, a network entity may configured a UE with a predicted set of beams $S_1$ using a first quantized orientation $O_1$ reported by the UE. At some point in time, such as when the UE determines that the signal strength of the beams included in set $S_1$ falls below a threshold value, the UE can determine that new beams are needed to reliably communicate with the network entity and can determine and report a second quantized orientation $O_2$ to the network entity. The network entity can predict a set of beams $S_2$ to use in communications with the UE using the machine learning model and the second quantized orientation $O_2$, transmit configuration information to the UE including information identifying the set of beams $S_2$, and communicate with the UE using the set of beams $S_2$.

In some implementations, the UE determines a geographic location of the UE and report the determined UE location to the gNB for use in predicting the set of best beams for communications between the UE and the gNB. The geographic location of the UE may be determined, for example, based on signals received and decoded from a satellite positioning system (such as NAVSTAR GPS or GALILEO, among other examples), based on time difference of arrival (TDOA) information for a plurality of cells, or other techniques that may be used to determine the geographic location of the UE. The UE may also determine a confidence level associated with the determined geographic location of the UE, which the gNB may use in identifying the set of best beams for communicating with the UE. The confidence level may be based, for example, on whether the UE is located in an urban, suburban, or rural environment, an amount of time needed to obtain a position lock using one or more geographic location determination systems, and the like.

In some implementations, the gNB can use the location information and the quantized orientation information to determine a best set of beams for the UE. For example, when a UE is in a given location, many different options may exist for the set of best beams based on the orientation of the UE. A beam with a higher azimuth orientation, for example, may be a best beam when the UE is oriented away from the gNB, and a beam with a lower azimuth orientation may be a best beam when the UE is oriented towards the gNB.

In some implementations, the gNB can use the location information and the quantized orientation information to augment a training data set used to train the machine learning model to predict a best beam (or best set of beams) to use in communicating with a UE at the reported location. Over time, the training data set may grow to include further updated information correlating UE location and/or orientation to a predicted best beam or best set of beams. As the training data set grows and is updated, a machine learning model trainer can retrain the machine learning model using the training data set and deploy the training data set to the gNB.

In some implementations, the gNB can use the determined confidence level reported by the UE to determine whether to predict a best beam for communications with the UE based on location and quantized orientation. If the determined confidence level indicates a low degree of confidence in the location reported by the UE, the gNB can identify a beam direction to use in communications with the UE using beam management schemes that involve transmitting a signal on each of the possible beam directions the gNB can use to communicate with the UE and request that the UE provide signal quality information to the gNB for each detected beam.

In general, various decisions related to UE location and/or SSB beam modification may happen at multiple nodes within a wireless network. For example, a beams-per-location database (for example, such as shown in FIG. 5) may be located at a gNB or at a central server (for example, an AI-based server) which does the training. In some cases, a gNB scheduler may perform the beam scheduling/assignment (for example, both for beam training and for data communication).

In some cases, position/location computation may be performed at the UE, the gNB, or a location server (for example, a LMF in 5G). Corresponding positioning messaging/reporting may need to be sent to the relevant node, depending on where the decisions are being made. Such messages may be routed through other nodes. For example, such message may be sent to a gNB, which then passes such messages on to a server (for example, an AI-based server). In other cases, such messages may be sent to a server, via a gNB, but in a message the gNB is unable to decode (in a message referred to as a 'containerized' message). Such messages may be used to carry positioning reports in certain protocols, such as LTE positioning protocol (LPP), which utilizes RRC messages between a UE and LMF. In some cases, an LMF may be located at a gNB. In such cases, the LPP protocol may still be used or faster (lower-layer) reports may be sent to the gNB (for example, via L1 or MAC-CE signaling), instead of containerized RRC messages.

Figure 9:
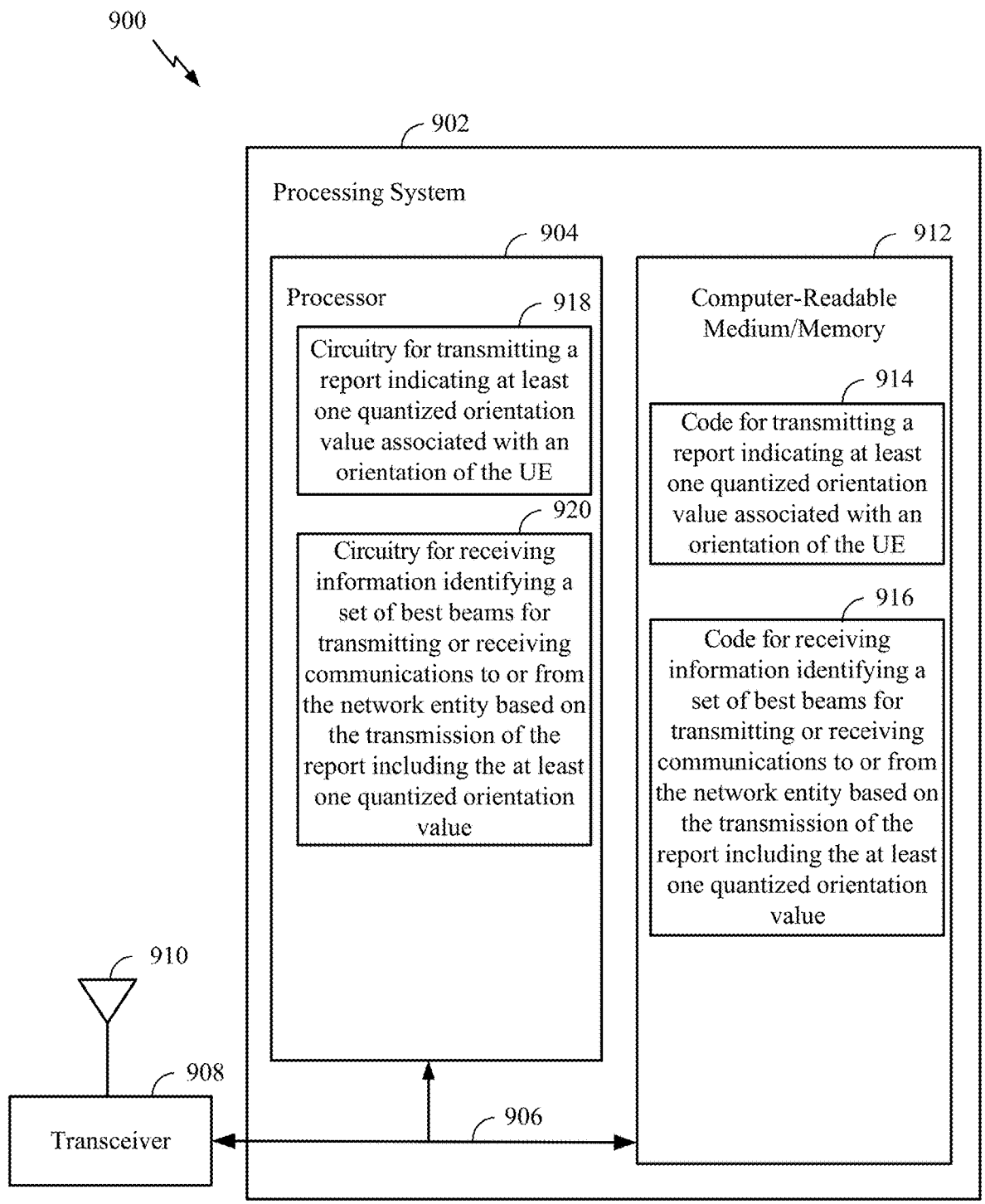
FIG. 9 shows an example communications device that includes components configured to perform operations that support beam selection based on quantized orientation information for a user equipment (UE), in accordance with aspects of the present disclosure.

FIG. 9 illustrates a communications device 900 (for example, a user equipment) that may include various components (for example, corresponding to means-plus-function components) configured to perform operations for the techniques disclosed herein, such as the operations illustrated in FIG. 6. The communications device 900 includes a processing system 902 coupled to a transceiver 908 (for example, a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In some aspects, the computer-readable medium/memory 912 is configured to store instructions (for example, computer-executable code) that when executed by the processor 904, cause the processor 904 to perform the operations illustrated in FIG. 6, or other operations for performing the various techniques discussed herein. In some aspects, computer-readable medium/memory 912 stores code 914 for transmitting a report indicating at least one quantized orientation value associated with an orientation of the UE to a network entity; and code 916 for receiving information identifying a set of best beams to use for transmitting or receiving communications to or from the network entity based on the transmission of the report including the at least one quantized orientation value. In some aspects, the processor 904 has circuitry configured to implement the code stored in the computer-readable medium/memory 912. The processor 904 includes circuitry 918 for transmitting a report indicating at least one quantized orientation value associated with an orientation of the UE to a network entity; and circuitry 920 for receiving information identifying a set of best beams to use for transmitting or receiving communications to or from the network entity based on the transmission of the report including the at least one quantized orientation value.

Figure 10:
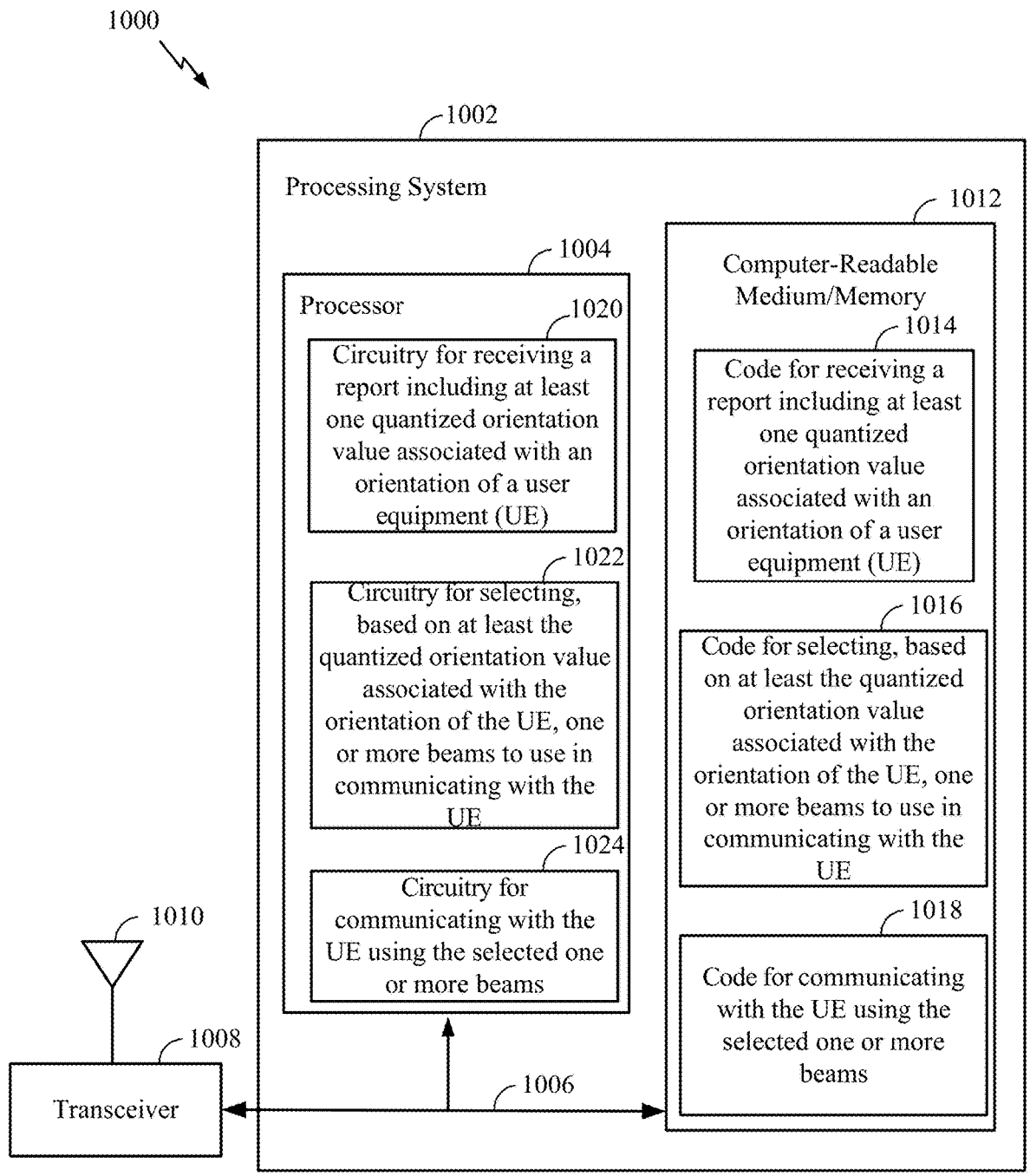
FIG. 10 shows an example communications device that includes components configured to perform operations that support beam selection based on quantized orientation information for a user equipment (UE), in accordance with aspects of the present disclosure.

FIG. 10 illustrates a communications device 1000 (for example, a network entity such as a gNB) that may include various components (for example, corresponding to means-plus-function components) configured to perform operations for the techniques disclosed herein, such as the operations illustrated in FIG. 7. The communications device 1000 includes a processing system 1002 coupled to a transceiver 1008 (for example, a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In some aspects, the computer-readable medium/memory 1012 is configured to store instructions (for example, computer-executable code) that when executed by the processor 1004, cause the processor 1004 to perform the operations illustrated in FIG. 7, or other operations for performing the various techniques discussed herein. In some aspects, computer-readable medium/memory 1012 stores code 1014 for receiving a report indicating at least one quantized orientation value associated with an orientation of a user equipment (UE); code 1016 for selecting, based on at least the quantized orientation value associated with the orientation of the UE, one or more beams to use in communicating with the UE; and code 1018 for communicating with the UE using the selected one or more beams. In some aspects, the processor 1004 has circuitry configured to implement the code stored in the computer-readable medium/memory 1012. The processor 1004 includes circuitry 1020 for receiving a report indicating at least one quantized orientation value associated with an orientation a user equipment (UE); circuitry 1022 for selecting, based on at least the quantized orientation value associated with the orientation of the UE, one or more beams to use in communicating with the UE; and circuitry 1024 for communicating with the UE using the selected one or more beams.

Example Aspects

Clause 1: A method for wireless communications by a user equipment (UE), comprising: transmitting, to a network entity, a report indicating at least one quantized orientation value associated with an orientation of the UE; and receiving, from the network entity, information identifying a set of first beams to use for transmitting or receiving communications to or from the network entity based on the transmission of the report including the at least one quantized orientation value.

Clause 2: The method of Clause 1, further comprising: determining the UE orientation based on measurements by orientation sensors at the UE, wherein the at least one quantized orientation value is based on the determined UE orientation.

Clause 3: The method of any one of Clauses 1 or 2, further comprising: receiving, from the network entity, signaling configuring a set of quantized orientation values, wherein the at least one quantized orientation value is from the set of quantized orientation values.

Clause 4: The method of Clause 3, wherein the signaling identifies at least one of a number of quantization levels or a quantization scheme for quantizing the orientation of the UE.

Clause 5: The method of any one of Clauses 3 or 4, wherein: the signaling configures at least two sets of quantized orientation values, each set of the at least two sets of quantized orientation values being associated with a respective type of signaling used to transmit the report; selecting the at least one quantized value comprises selecting a quantized orientation value from one of the at least two sets of quantized orientation values based on the type of signaling used to transmit the report; and a granularity of each set of quantized orientation values in the at least two sets of quantized orientation values is different.

Clause 6: The method of Clause 5, wherein the type of signaling comprises one of uplink control information (UCI), a medium access control (MAC) control element (CE), or radio resource control (RRC) signaling.

Clause 7: The method of any one of Clauses 1 through 6, wherein the report indicates a location of the UE.

Clause 8: The method of Clause 7, wherein: the report indicates a quantized confidence level, from a set of quantized confidence levels, that is associated with the location of the UE.

Clause 9: The method of any one of Clauses 7 or 8, wherein transmitting the report comprises transmitting a radio resource control (RRC) message targeting a location management function (LMF).

Clause 10: A method for wireless communications by a network entity, comprising: receiving a report indicating at least one quantized orientation value associated with an orientation of a user equipment (UE); selecting, based on at least the quantized orientation value associated with the orientation of the UE, one or more beams to use in communicating with the UE; and communicating with the UE using the selected one or more beams.

Clause 11: The method of Clause 10, further comprising: transmitting, to the UE, signaling configuring a set of quantized orientation values including the at least one quantized orientation value.

Clause 12: The method of Clause 11, wherein the signaling identifies one or more of a number of quantization levels or a quantization scheme for quantizing a measured orientation of the UE.

Clause 13: The method of Clause 12, wherein: the signaling indicates at least two sets of quantized orientation values, wherein each set of the at least two sets of quantized orientation values is associated with a type of signaling used for the report.

Clause 14: The method of Clause 13, wherein the at least one quantized orientation value is included in one of the at least two sets of quantized orientation values depending on whether the report is signaled via uplink control information (UCI), a medium access control (MAC) control element (CE), or radio resource control (RRC) signaling.

Clause 15: The method of any one of Clauses 10 through 14, wherein the report indicates a location of the UE, and the one or more beams are selected further based on the location of the UE.

Clause 16: The method of Clause 15, further comprising: updating a training data set based on the at least one quantized orientation value, the location of the UE, and the selected one or more beams; and retraining a machine learning model for predicting one or more beams to use to communicate with the UE based on the updated training data set.

Clause 17: The method of any one of Clauses 15 or 16, wherein: the report indicates a confidence level associated with the location of the UE, and the confidence level comprises a quantized confidence level selected from a set of quantized confidence levels.

Clause 18: The method of Clause 17, wherein the one or more beams are selected using a machine learning model for predicting one or more beams to use to communicate with the UE when the confidence level exceeds a threshold value.

Clause 19: The method of any one of Clauses 10 through 18, wherein the selected one or more beams are selected based on a machine learning model trained to predict one or more beams to use to communicate with the UE based at least on the at least one quantized orientation value.

Clause 20: The method of any one of Clauses 10 through 18, wherein the at least one quantized orientation value is received from a gNodeB.

Clause 21: The method of any one of Clauses 10 through 18, wherein the at least one quantized orientation value is received in a radio resource control (RRC) message from a user equipment via a gNodeB.

Clause 22: An apparatus, comprising: a memory having executable instructions stored thereon; and a processor configured to execute the executable instructions to perform the operations of any of Clauses 1 through 21.

Clause 23: An apparatus, comprising: means for performing the operations of any of Clauses 1 through 21.

Clause 24: A computer-readable medium having instructions stored thereon which, when executed by a processor, performs the operations of any of Clauses 1 through 21.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA) or cdma2000. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (for example 5G RA), Evolved UTRA (E-UTRA), Ultra Mobile Broadband (UMB), IEEE 802.11 (Wi-Fi), IEEE 802.16 (WiMAX), IEEE 802.20 or Flash-OFDMA, among other examples. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG) or UEs for users in the home). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring or a smart bracelet), an entertainment device (for example, a music device, a video device or a satellite radio, among other examples), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors or location tags, among other examples, that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   receiving, from a network entity, signaling configuring a set of quantized orientation values;
   transmitting, to the network entity, a report indicating at least one quantized orientation value associated with an orientation of the UE, wherein the at least one quantized orientation value is from the set of quantized orientation values; and
   receiving, from the network entity, information identifying a set of first beams to use for transmitting or receiving communications to or from the network entity based on the transmission of the report including the at least one quantized orientation value.

2. The method of claim 1, further comprising: determining the UE orientation based on measurements by orientation sensors at the UE, wherein the at least one quantized orientation value is based on the determined UE orientation.

3. The method of claim 1, wherein the signaling identifies at least one of a number of quantization levels or a quantization scheme for quantizing the orientation of the UE.

4. The method of claim 1, wherein:
   the signaling configures at least two sets of quantized orientation values, each set of the at least two sets of quantized orientation values being associated with a respective type of signaling used to transmit the report;
   selecting the at least one quantized value comprises selecting a quantized orientation value from one of the at least two sets of quantized orientation values based on the type of signaling used to transmit the report; and
   a granularity of each set of quantized orientation values in the at least two sets of quantized orientation values is different.

5. The method of claim 4, wherein the type of signaling comprises one of uplink control information (UCI), a medium access control (MAC) control element (CE), or radio resource control (RRC) signaling.

6. The method of claim 1, wherein the report indicates a location of the UE.

7. The method of claim 6, wherein:
   the report indicates a quantized confidence level, from a set of quantized confidence levels, that is associated with the location of the UE.

8. The method of claim 6, wherein transmitting the report comprises transmitting a radio resource control (RRC) message targeting a location management function (LMF).

9. A method for wireless communications by a network entity, comprising:
   transmitting, to a UE, signaling configuring a set of quantized orientation values;
   receiving a report indicating at least one quantized orientation value associated with an orientation of the user equipment (UE), wherein the at least one quantized orientation value is a value from the set of quantized orientation values;
   selecting, based on the at least one quantized orientation value associated with the orientation of the UE, one or more beams to use in communicating with the UE; and
   communicating with the UE using the selected one or more beams.

10. The method of claim 9, wherein the signaling identifies one or more of a number of quantization levels or a quantization scheme for quantizing a measured orientation of the UE.

11. The method of claim 10, wherein:
    the signaling indicates at least two sets of quantized orientation values, wherein each set of the at least two sets of quantized orientation values is associated with a type of signaling used for the report.

12. The method of claim 11, wherein the at least one quantized orientation value is included in one of the at least two sets of quantized orientation values depending on whether the report is signaled via uplink control information (UCI), a medium access control (MAC) control element (CE), or radio resource control (RRC) signaling.

13. The method of claim 9, wherein the report indicates a location of the UE, and the one or more beams are selected further based on the location of the UE.

14. The method of claim 13, further comprising:
    updating a training data set based on the at least one quantized orientation value, the location of the UE, and the selected one or more beams; and
    retraining a machine learning model for predicting one or more beams to use to communicate with the UE based on the updated training data set.

15. The method of claim 13, wherein:
the report indicates a confidence level associated with the location of the UE, and
the confidence level comprises a quantized confidence level selected from a set of quantized confidence levels.

16. The method of claim 15, wherein the one or more beams are selected using a machine learning model for predicting one or more beams to use to communicate with the UE when the confidence level exceeds a threshold value.

17. The method of claim 9, wherein the selected one or more beams are selected based on a machine learning model trained to predict one or more beams to use to communicate with the UE based at least on the at least one quantized orientation value.

18. The method of claim 9, wherein the at least one quantized orientation value is received from a gNodeB.

19. The method of claim 9, wherein the at least one quantized orientation value is received in a radio resource control (RRC) message from a user equipment via a gNodeB.

20. An apparatus for wireless communications by a user equipment, comprising:
a memory having executable instructions stored thereon; and
a processor configured to execute the executable instructions to cause the apparatus to:
receive, from a network entity, signaling configuring a set of quantized orientation values,
transmit, to the network entity, a report including at least one quantized orientation value associated with an orientation of the UE, wherein the at least one quantized orientation value is from the set of quantized orientation value, and
receive, from the network entity, information identifying a set of first beams to use for transmitting or receiving communications to or from the network entity based on the transmission of the report including the at least one quantized orientation value.

21. The apparatus of claim 20, wherein the processor is further configured to cause the apparatus to: determine the UE orientation based on measurements by orientation sensors at the UE, wherein the at least one quantized orientation value is based on the determined UE orientation.

22. The apparatus of claim 20, wherein:
the signaling configures at least two sets of quantized orientation values, each set of the at least two sets of quantized orientation values being associated with a respective type of signaling used to transmit the report;
in order to select the at least one quantized value, the processor is configured to cause the apparatus to select a quantized orientation value from one of the at least two sets of quantized orientation values based on the type of signaling used to transmit the report; and
a granularity of each set of quantized orientation values in the at least two sets of quantized orientation values is different.

23. The apparatus of claim 22, wherein the type of signaling comprises one of uplink control information (UCI), a medium access control (MAC) control element (CE), or radio resource control (RRC) signaling.

24. The apparatus of claim 20, wherein the report indicates a location of the UE.

25. The apparatus of claim 24, wherein:
the report indicates a quantized confidence level, from a set of quantized confidence levels, that is associated with the location of the UE.

26. The apparatus of claim 24, wherein the report is transmitted via a radio resource control (RRC) message targeting a location management function (LMF).

27. An apparatus for wireless communications by a network entity, comprising:
a memory having executable instructions stored thereon; and
a processor configured to execute the executable instructions to cause the apparatus to:
transmit, to a UE, signaling configuring a set of quantized orientation values,
receive, from the user equipment (UE), a report including at least one quantized orientation value associated with an orientation of the UE, wherein the at least one quantized orientation value is a value from the set of quantized orientation values,
select, based on the at least one quantized orientation value associated with the orientation of the UE, one or more beams to use in communicating with the UE, and
communicate with the UE using the selected one or more beams.

\* \* \* \* \*